(No Model.)
R. E. MOREY.
FRUIT BOX.
No. 390,135. Patented Sept. 25, 1888.
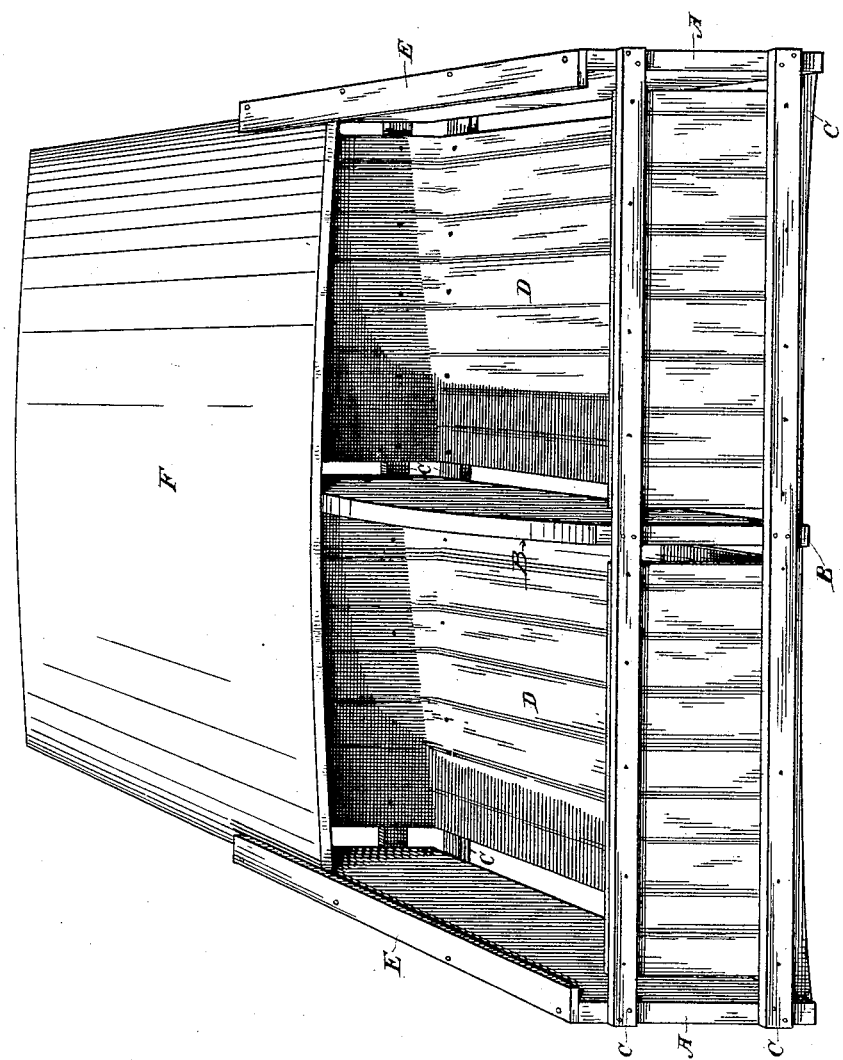
Witnesses,
Geo. H. Strong.
J. A. Rouse
Inventor
R. E. Morey.
By Dewey & Co
atty

UNITED STATES PATENT OFFICE.

ROSWELL E. MOREY, OF SAN FRANCISCO, CALIFORNIA.

FRUIT-BOX.

SPECIFICATION forming part of Letters Patent No. 390,135, dated September 25, 1888.

Application filed June 9, 1888. Serial No. 276,613. (No model.)

*To all whom it may concern:*

Be it known that I, ROSWELL E. MOREY, of the city and county of San Francisco, State of California, have invented an Improvement in Fruit-Boxes; and I hereby declare the following to be a full, clear, and exact description of the same.

My invention relates to a package for the transportation of small fruits and berries; and it consists in the improved fruit-box which I shall hereinafter fully describe and claim.

The figure is a perspective view showing the box with the cover partially removed.

A A are the end boards of my box, and B is a similar central partition.

C C are strips or bars of wood, which are nailed to the ends A and central partition, B, two of these slats forming each side and two more forming the bottom, thus holding the transverse boards A and B firmly together.

D D are strips of thin veneering, such as is usually employed for berry-baskets. These strips are made of a width nearly equal to the length of each compartment, and the length is such that the veneer forms the bottom and the sides of the compartment, being bent at the angles, so that it extends across the bottom and up the two sides, and is suitably attached to the side and bottom bars C C. A small space is left on each side of this veneer bottom between its edges and the transverse partitions A and B, so that air may enter to perfectly ventilate the fruit without allowing the latter to fall through the spaces.

The central partition, B, is arched slightly upon the upper edge, and strips E, projecting inwardly from the ends A, form guides, beneath which the ends of the cover F will slip. The center of the cover, passing over the arched central partition, B, will be caused to spring upward, and thus retain the cover in place without any necessity for nailing it; but, if desired, it is easily secured by a single nail (not shown) driven into the central partition. The bottom of the crate is also slightly arched upward, as shown, so that when filled with fruit any tendency to spring downward will act to straighten the cover out between the ends, and will thus bind it more firmly in place. By this construction I am enabled to make a strong and simple box or crate for berries and small fruits, and these boxes may be piled one upon another without any danger of injuring the contents.

This box differs from the ordinary berry-boxes in being complete in itself, whereas the veneer berry-boxes are usually packed into independent crates, from which they can be removed separately.

Having thus described my invention, what I claim as new, and desire to secure by Letters Patent, is—

1. A fruit or berry box consisting of the transverse ends and central partitions, having an arched top, the bars nailed to the edges, and the interior veneers formed of single strips extending across the bottom and up the sides of the boxes, in combination with the plane flexible cover F, sliding in guides, whereby when said cover is introduced it is bent, substantially as herein described.

2. The berry-box consisting of the transverse ends, having the inwardly-projecting pieces E, the central diaphragm, B, having its upper edge made higher than the ends, the uniting-bars C, nailed to the sides and bottom of the ends and center partition, and the veneers secured within the bars C to form the bottom and sides of the boxes, in combination with the cover F, the ends of which slide beneath the projections E, while the center is arched or forced upward by the raised central partition, substantially as herein described.

3. A berry-box consisting of the ends and central arched partition united by longitudinal bars or strips nailed thereto, the bottom bars being arched, whereby the central portion of the bottom of the box is raised slightly above the ends, veneers secured within the bars extending transversely to form the bottom and sides to the box, and the plane flexible cover F, sliding in guides, whereby when said cover is introduced it is bent, substantially as herein described.

In witness whereof I have hereunto set my hand.

ROSWELL E. MOREY.

Witnesses:
C. D. COLE,
J. H. BLOOD.